(12) United States Patent
Gumpoltsberger

(10) Patent No.: US 7,155,994 B2
(45) Date of Patent: Jan. 2, 2007

(54) SIX-GEAR OR SEVEN-GEAR DUAL-CLUTCH TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/771,723

(22) Filed: Feb. 4, 2004

(65) Prior Publication Data

US 2005/0000307 A1    Jan. 6, 2005

(30) Foreign Application Priority Data

Feb. 8, 2003    (DE) ................. 103 05 241

(51) Int. Cl.
*F16H 3/38* (2006.01)
*F16H 3/08* (2006.01)

(52) U.S. Cl. .......................... 74/340; 74/331
(58) Field of Classification Search ............ 74/330, 74/331, 340
See application file for complete search history.

(56) References Cited

U.S. PATENT DOCUMENTS

| | | | | |
|---|---|---|---|---|
| 4,548,101 | A * | 10/1985 | Akashi et al. ............. | 74/720 |
| 4,658,662 | A * | 4/1987 | Rundle ................... | 74/331 |
| 4,802,373 | A | 2/1989 | Saint-Jean et al. | |
| 5,560,249 | A * | 10/1996 | Nellums ................. | 74/339 |
| 6,209,407 | B1 * | 4/2001 | Heinzel et al. ............ | 74/331 |
| 6,250,171 | B1 * | 6/2001 | Sperber et al. ........... | 74/331 |
| 6,755,089 | B1 * | 6/2004 | Hirt ...................... | 74/329 |
| 6,887,180 | B1 * | 5/2005 | Pels et al. ................ | 477/3 |
| 2002/0104397 | A1 * | 8/2002 | Bowen .................... | 74/329 |
| 2003/0121343 | A1 * | 7/2003 | Berger et al. ............. | 74/340 |

FOREIGN PATENT DOCUMENTS

| | | |
|---|---|---|
| DE | 41 22 628 A1 | 1/1993 |
| DE | 42 26 577 C1 | 2/1994 |
| DE | 198 21 164 A1 | 11/1999 |
| DE | 198 53 824 A1 | 5/2000 |
| DE | 199 23 185 A1 | 12/2000 |
| DE | 100 54 318 A1 | 5/2002 |
| GB | 002103316 A * | 2/1983 ............ 74/330 |

* cited by examiner

*Primary Examiner*—Roger Pang
(74) *Attorney, Agent, or Firm*—Davis & Bujold, P.L.L.C.

(57) ABSTRACT

A six-gear or seven-gear dual-clutch transmission (1, 30) comprising two clutches (K1, 2) the input sides of which are connected with one drive shaft (2) of a prime mover and the output sides with each one of two input shafts (3, 4) disposed coaxially to each other, two countershafts (4, 5) upon which gear wheels designed as idler wheels are rotatably supported, gear wheels designed upon input shaft (3, 33, 37) and in tooth contact with idler wheels (8, 9, 10, 15, 16, 17, 34, 35, 36), coupling devices (22, 23, 24, 25, 31, 32) non-rotatably and axially movably supported on both countershafts (5, 6), and movable via setting devices and one output gear wheel (18, 19) on a respective countershaft (5, 6) which are in tooth contact with a toothing (20) on one differential transmission (21). To shorten the length and reduce the multiplicity of parts, the six-gear and seven-gear transmission (1, 30) are designed so that upon one input shaft (3) two fixed wheels (13, 14) and upon the other input shaft (4) at least one other fixed wheel (12) are situated for respectively driving two idler wheels (8, 15 and 35, 36; 9, 16; 10, 17).

19 Claims, 2 Drawing Sheets

SIX-GEAR OR SEVEN-GEAR DUAL-CLUTCH TRANSMISSION

This application claims priority from German Application Serial No. 103 05 241.0 filed Feb. 8. 2003.

FIELD OF THE INVENTION

The invention concerns a six-gear or seven-gear dual-clutch transmission

BACKGROUND OF THE INVENTION

From DE 198 21 164A1 has become known a typical six-gear dual-clutch transmission in which two fixed wheels are situated upon a first input shaft designed as hollow shaft. While the first fixed wheel is in tooth contact with the idler wheel for the reverse gear and a second idler wheel for the second gear, the second fixed wheel meshes with one idler wheel for the sixth gear and with one idler wheel for the fourth gear. In addition, the idler wheels for the reverse gear and the sixth gear are supported in the transmission upon a first countershaft while the idler wheels for the second gear and the fourth gear are placed upon a second countershaft. This dual-clutch transmission has a comparatively short construction so that it can be used for crosswise installation in a motor vehicle.

From DE 199 23 185 A1 has further become known a dual-clutch transmission in which both, upon a hollow first input shaft and upon the second input shaft, are supported therein and designed as solid shaft, a respective fixed wheel is situated which drives each of two idler wheels of different transmission gears. The first fixed wheel situated upon the hollow shaft thus meshes with the idler wheel for the third gear and the idler wheel for the fifth gear. The second fixed wheel situated upon the solid shaft is, on the other hand, in tooth contact with the idler wheels for the second and for the fourth gears.

With this background, the problem on which the invention is based is to introduce a structure for dual-clutch transmissions which can be used both in a six-gear transmission and in a seven-gear transmission. Besides, a six-gear transmission thus built must be shorter than the known generic transmission drafts and the seven-gear dual-clutch transmission must fit in a similar vehicle installation space which hitherto had been adequate only for dual-clutch transmission having less gears. Finally, by reducing the hitherto needed transmission parts, the production cost is lowered.

SUMMARY OF THE INVENTION

Accordingly, the invention departs from a dual-clutch transmission having two clutches, the input sides of which are connected with the drive shaft of a prime mover and the output sides are connected with each of two coaxially disposed input shaft. The transmission also has two countershafts available which are preferably aligned paraxially with the input shaft.

Upon said countershafts are rotatably supported gear wheels as designed as idler wheels while upon the two input shafts there are situated gear wheels designed as fixed wheels which drive said idler wheels. For non-rotatable connection of the idler wheels with the respective countershafts there is disposed upon these, preferably between two respective idler wheels, one coupling device non-rotatably supported on the shafts and axially movable by means of setting devices. Each countershaft also has one non-rotatably situated output gear wheel available which is in tooth contact with one toothing on a differential transmission.

Such a generic dual-clutch transmission has now been inventively developed so that upon one input shaft two fixed wheels and upon the other input shaft at least one other fixed wheel are situated for respectively driving two fixed wheels upon the two countershafts.

The two fixed wheels first mentioned are preferably fastened on the input shaft designed as hollow shaft while at least one other fixed wheel is situated upon the second input shaft designed as solid shaft.

In one other preferred development of the invention, it is provided that in the six-gear transmission and in the seven-gear transmission the idler wheels of the highest gear G6 or G7 and the idler wheels of the second highest gear G5 or G6 are located upon the one countershaft while the idler wheels of the third highest gear G5 or G5 and the idler wheels of the fourth highest gear G3 or RG are supported on the other countershaft.

The transmission can further be constructed so that the idler wheel for the second gear and the idler wheel for the reverse gear are supported on different countershafts and are actuatable by a common fixed wheel.

Insofar as a six-gear transmission is built, according to said transmission draft, it is preferably provided that the gear wheels in the transmission are disposed, beginning from the direction of both clutches, in the sequence reverse gear and second gear, fourth gear and sixth gear, third gear and fifth gear, the same as first gear wherein, up to the first gear, each two idler wheels of different gears are driven by one fixed wheel.

On the other hand, if a seven-gear dual-clutch transmission is to be implemented, according to said draft, preferably it is to be provided that the gear wheels in the transmission be disposed, beginning from direction of the two clutches, in the sequence reverse gear and second gear, fourth gear and sixth gear, fifth gear and seventh gear, first gear and third gear wherein up to the first and third gears each two idler wheels of different gears are driven by one fixed wheel.

Even though the center distances of both countershafts from input shafts van be different in the six-gear transmission from the one in a seven-gear transmission, in order to reduce the multiplicity of parts and thus the production cost, it is proposed to select the same center distances in both transmissions. Independently of the preferred use of the same center distances in a six-gear and in a seven-gear dual-clutch transmission of the kind shown here, it is advantageous to dispose the countershafts forming an angle with the two input shafts. In this way, it is possible to adjust specially advantageous reduction ratios between the output gear wheels on both countershafts, and the output toothing on the differential transmission.

The transmission structure proposed is associated with the advantage that the six-gear dual-clutch transmission differs from the seven-gear dual-clutch transmission which, to a gear extent, has the same construction only by the fact that the gear-wheels of the third and of the fifth gears are different, the same as that one other fixed wheel and one seventh gear wheel are needed.

One other feature of the inventive transmission structure can also concern the arrangement of the output gear wheels on the two countershafts according to which these are preferably fastened on the end thereof pointing to the clutches. Besides, the six-gear or seven-gear dual-clutch transmission can be designed so that the linear gears or the non-linear gears are preferably driven by the outer input shaft designed as a hollow shaft.

For non-rotatable connection of the idler wheels with the respective countershafts, it is advantageous in the six-gear and the seven-gear transmissions that in the first section for the transmission, the fourth gear and the reverse gear with a common coupling device and the second and sixth gear with one other common coupling device are non-rotatably connectable with the first countershaft and the second countershaft, respectively.

It is further proposed in the second section of the transmission of the six-gear dual-clutch transmission, the first gear and the third gear with a common coupling device and the fifth gear with one last coupling device are non-rotatably connectable alternatively with the first countershaft and the second countershaft, respectively, while in the second section of the transmission of the seven-gear dual-clutch transmission, the first gear and the fifth gear with a common coupling device and the third gear and he seventh gear with another common coupling device are non-rotatably connected alternatively with the first countershaft and the second countershaft, respectively.

The coupling devices have the same construction in order to reduce the multiplicity of parts both in the six-gear and in the seven-gear dual-clutch transmissions, it being possible to design them as positive fit dog clutches or as shifting sets. The shifting sets comprise, in a manner known per se, one sliding sleeve axially movable upon the respective countershaft, but non-rotatably connected therewith and synchronizer rings located to the right and/or left thereof.

Regarding the arrangement of the gear wheels of the first gear, of the second gear and/or of the reverse gear, the area of the front sides of the transmission housing is preferred even though an arrangement of said gear wheels reversal of the gear sequence is also possible in the area of the center of the transmission.

In another design of the inventive transmission structure, it is provided that the first clutch K1, located closer in direction to the prime mover, are used as starting clutch for the first gear while the second clutch K2, farther removed from the prime mover, serves as starting clutch for the reverse gear.

With regard to both clutches K1, K2, it is deemed advantageous that they are designed as power shifting clutches, preferably as multi-disc clutches or as dry one-disc clutches, and disposed paraxially or coaxially with each other.

In addition, with the two clutches can be associated as separate starting element 39, preferably a hydrodynamic torque converter which, by driving technique, can be incorporated in the drive train between the drive shaft of the prime mover and the input side of the clutches K1, K2.

For mechanical connection of both clutches, the transmission has available on the output sides of both clutches or on the two input shafts, one shifting device with which the two drive shafts or clutches can be non-rotatably interconnected for performing a starting operation.

Should it be necessary to reduce vibrations in the drive train, it is also possible to situate one torsional vibration damper 40 between the two (first and second) clutches K1, K2 and the drive shaft of the prime mover.

For the case that the coupling devices on the idler wheels are designed as dog clutches, in another development of the invention, it is possible to dispose on both countershafts and/or at least one of the two countershafts one section for the transmission brake (retarder) by means of which the shafts can be decelerated during an upshift operation.

In addition, on the two countershafts and/or on at least one of the two countershafts, the flexibility of the transmission draft allows that at least one other gear wheel is placed for driving auxiliary units. But such a gear wheel can also serve to drive an electric generator with which, for example, an electric energy accumulator can be loaded during power off propulsion phases. Such as electric generator, however, can also be driven by a driving toothing on the input side of the clutch on the clutch housing, for example.

The inventively designed six-gear and seven-gear dual-clutch transmission can be combined with a power divider differential transmission, such as for a vehicle with front-wheel drive, but also a longitudinal divider differential transmission so that those transmissions can also be used for all-wheel vehicles.

Finally, the setting device for actuation for the coupling devices can be designed so that it can be actuated manually or with servo assistance, the setting devices working with servo assistance having piston-cylinder systems which can be operated with a hydraulic or pneumatic pressure medium.

BRIEF DESCRIPTION OF THE DRAWINGS

The invention will now be described, by way of example, with reference to the accompanying drawings in which.

DETAILED DESCRIPTION OF THE INVENTION

Figure 1:
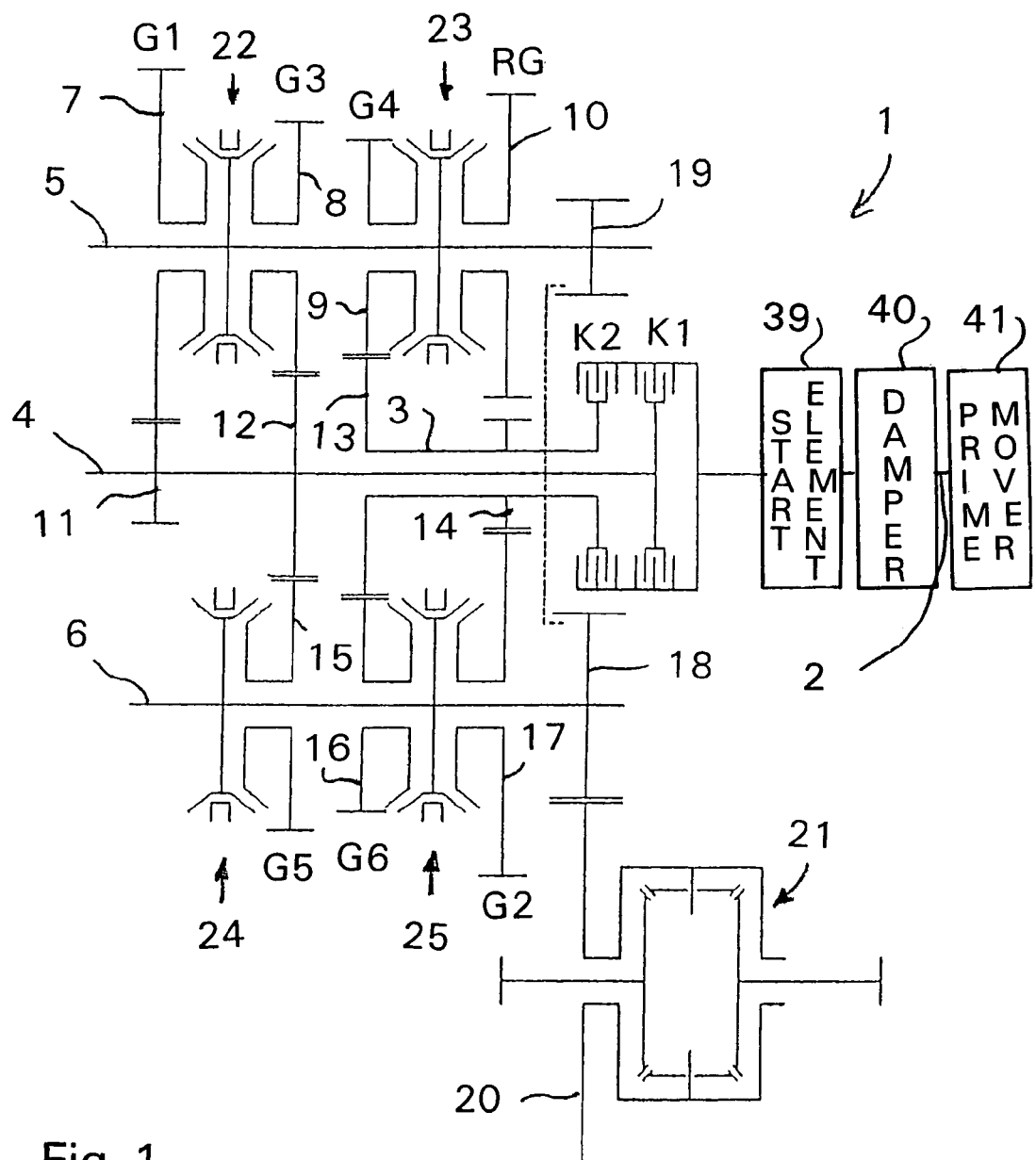
FIG. 1 shows a diagrammatic representation for a six-gear dual-clutch transmission.

As can be understood from FIG. 1, a six-gear dual-clutch transmission 1 designed, according to the fundamental idea of the invention, comprises in the first place two clutches K1, 2 which are axially, consecutively disposed in this embodiment. The input side of which the two clutches K1, K2 is non-rotatably connected with a drive shaft 2 of a prime mover 41 which, as a rule, is an internal combustion engine.

The output sides of the clutches K1, K2 are connected with two input shafts (3, 4) disposed coaxially to each other. The first input shaft 3 is designed as a hollow shaft and the second input shaft 4 as a solid shaft, the latter being rotatably supported in the hollow shaft.

In this transmission, paraxially with the two input shaft 3, 4 are situated two countershaft 5, 6 upon which are rotatably supported the gear wheels (idler wheels) of the six ratio steps. The idler wheels are driven by the driving gear wheels (fixed wheels) which are fastened on the input shafts 3, 4.

Upon the two countershafts 5, 6, on the ends thereof pointing in the direction of the two clutches K1, K2, output gear wheels 18, 19 are fastened which are in tooth contact with a toothing 20 of an axle differential transmission 21 so that the latter can be driven by the two countershafts 5, 6.

In the transmission shown in FIG. 1, in order to achieve a more compact construction in comparison with the dual-clutch transmissions known already, it is now provided that there is situated upon the input shaft 3 designed as a hollow shaft two fixed wheels 13, 14 and upon the second input shaft 4 designed as a solid shaft one other fixed wheel 12 which respectively drives two idler wheels supported on different countershafts 5, 6.

In the example shown in FIG. 1, the fixed wheel 14 situated closest to the two clutches K1, K2 and fastened upon the input shaft 3 designed as a hollow shaft, drives an idler wheel 10 for a reverse gear RG which is supported on the first countershaft 5 and simultaneously an idler wheel 17 for a second gear G2 which is supported on the second countershaft 6. Besides, fastened upon said input shaft 3, the second fixed wheel 13 which is in tooth contact with the idler wheel 9 for a fourth gear G4 and with one idler wheel 16 for a sixth gear G6.

The second input shaft 4 designed as a solid shaft carries the third fixed wheel 12 which meshes with the idler wheel 8 for a third gear G3 on the first countershaft 5 and with an idler wheel 15 for a fifth gear G5 on the second countershaft 6. There is further fastened on said second input shaft 4 one fourth fixed wheel 11 which drives only one idler wheel 7 for a first gear G1.

For more clarity in this representation, it is now shown that the reverse idler wheel 10 is in tooth contact with a reverse fixed wheel which is fastened upon a separate reverse gear shaft. One other reverse fixed wheel upon said reverse gear shaft RG meshes with the contact toothing 20 on the differential transmission 21.

In addition, FIG. 1 shows that between the idler wheel 7 for the first gear G1 and the idler wheel 8 for the third gear G3, the same as between the idler wheel 9 for the fourth gear G4 and the idler wheel 10 for the reverse gear RG on the countershaft 5, there is situated one coupling device 22, 23. Another utilizable double-duty coupling device 25 is situated upon the second countershaft 6 between the idler wheel 16 for the sixth gear G6 and the idler wheel 17 for the second gear G2 while an easily acting coupling device 24 is associated with the idler wheel 15 for the fifth gear G5.

The coupling devices 22, 23, 24, 25 can be designed, in a manner known per se, as dog clutches or as shifting sets comprising sliding sleeves and synchronizer rings. But involved in each case are coupling means non-rotatably and axially movably disposed on respective countershafts and with which the idler wheels van be non-rotatably connected with the countershafts associated with them for engaging a transmission ratio. The coupling means are axially moved, via a setting deice (not shown here), actuatable manually or by servo assisted setting means.

The construction shown and described of the six-gear dual-clutch transmission makes clear that by the double use according to driving technique of the three fixed wheels 12, 13, 14 on the two input shaft 3, 4, the length of the transmission can be considerably reduced to a gear extent.

The first section of this six-gear transmission 1 definably by the hollow input shaft 3 together with its fixed and idler wheels serve also for building a seven-gear dual-clutch transmission 30 without nothing having constructionally to be changed in the multiplicity of the parts collected in this area. As made clear in FIG. 2, the seven-gear dual-clutch transmission 30 actually consists to a great extent of the parts of the six-gear dual-clutch transmission 1 shown in FIG. 1 so that as a result of the great number of equal parts and thus high number of pieces good reduction in cost can be achieved in the production of both types of transmissions.

Since the fixed and idler wheels driven by the first input shaft 3 designed as a hollow shaft are identical with those of the six-gear transmission in FIG. 1 and provided with the same reference numerals, the repetition for the description of said transmission part is omitted here.

The second section for transmission driveable by the second input shaft 4 has in the first place one fixed wheel 37 available fastened on said input shaft 4 and meshing with an idler gear 35 of the fifth gear G5 and with an idler wheel 36 of the seventh gear G7. Upon said input shaft 4, designed as a solid shaft, further sits one other fixed wheel 11 which is in tooth contact with the idler wheel 7 of the first gear G1, the same as a last fixed wheel 33 which drives an idler wheel 34 of the third gear G3.

The coupling devices 31, 32 situated between the idler wheels 7, 35 for the first gear G1 and the fifth gear G5, the same as between the idler wheels 34, 36 for the third gear G3 and the seventh gear G7, are also designed for double duty. Thus the seven-gear dual-clutch transmission is also extremely short, since three of the five fixed wheels, the same as all four coupling devices, can be doubly used. Thus, the seven-gear dual-clutch transmission can be easily inserted in a motor vehicle in front, crosswise installation.

Figure 2:
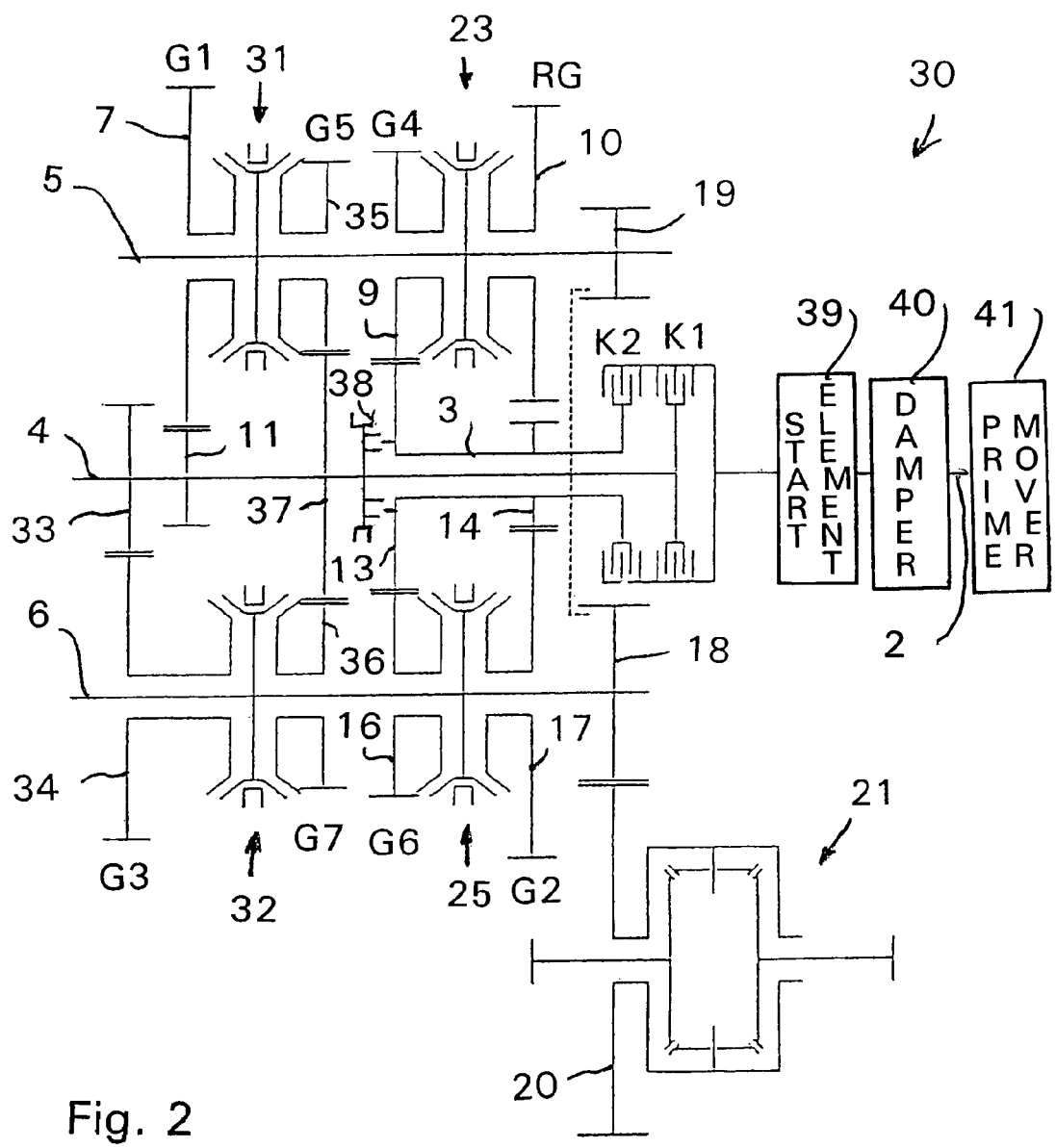
FIG. 2 shows a diagrammatic representation of a seven-gear dual-clutch transmission.

If very strong thermal loads of the first clutch K1 are to be feared in a starting operation in the first gear or of the second clutch K2 in a starting operation in reverse gear RG (trailer operation on the slope), it is possible to use, in the transmission shown in FIG. 2, another coupling device 38 with which both input shafts 3, 4 can be rigidly connected. In this manner, both clutches K1, K2 have doubled torque-transfer capacity available for a starting operation.

With such dual-clutch transmissions, there are well suited ratio sequences obtained for motor vehicles, which despite the multiple use of the ratio steps in a six-gear and a seen-gear transmission, are almost progressively graduated. The ratio sequences are even more ideal when the center distance between the transmission input shafts 3, 4 and the two countershafts 4, 5 is varied. Thus there result the ratio sequences shown below.

| 6-Gear Ratio Sequence (Equal Center Distance) | | | | | | |
| --- | --- | --- | --- | --- | --- | --- |
| | G1 | G2 | G3 | G4 | G5 | G6 | RG |
| Ratio | 14.9 | 7.9 | 5.2 | 4.1 | 3.2 | 2.5 | −11.7 |
| Ratio Range | 1.89 | 1.53 | 1.26 | 1.3 | 1.29 | =6.1 | |

| 6-Gear Ratio Sequence (Variable Center Distance) | | | | | | |
| --- | --- | --- | --- | --- | --- | --- |
| | G1 | G2 | G3 | G4 | G5 | G6 | RG |
| Ratio | 15.2 | 8.4 | 5.4 | 4.2 | 3.2 | 2.5 | −13.5 |
| Ratio Range | 1.8 | 1.55 | 1.3 | 1.3 | 1.27 | =6 | |

| 7-Gear Ratio Sequence (Equal Center Distance) | | | | | | | |
| --- | --- | --- | --- | --- | --- | --- | --- |
| | G1 | G2 | G3 | G4 | G5 | G6 | G7 | RG |
| Ratio | 16.9 | 9.6 | 6.2 | 4.4 | 3.6 | 2.9 | 2.3 | −13.2 |
| Ratio Range | 1.75 | 1.55 | 1.41 | 1.23 | 1.24 | 1.23 | =7.2 | |

| 7-Gear Ratio Sequence (Variable Center Distance) | | | | | | | |
| --- | --- | --- | --- | --- | --- | --- | --- |
| | G1 | G2 | G3 | G4 | G5 | G6 | G7 | RG |
| Ratio | 16.8 | 9.4 | 6.0 | 4.3 | 3.5 | 2.8 | 2.3 | −13.7 |
| Ratio Range | 1.78 | 1.57 | 1.40 | 1.24 | 1.22 | 1.21 | =7.2 | |

As has become clear, the transmission draft essential to the invention has a series of advantages to which belongs the very reduced length compared to the known transmission drafts. The transmissions are fully capable of a powershift and by reduction of the parts definitely lighter than in a different design. Finally, it is possible to implement ratio steps specially well suited for motor vehicles.

| Reference numerals | |
|---|---|
| 1 | dual-clutch transmission |
| 2 | drive shaft |
| 3 | first input shaft |
| 4 | second input shaft |
| 5 | first countershaft |
| 6 | second countershaft |
| 7 | idler wheel |
| 8 | idler wheel |
| 9 | idler wheel |
| 10 | reverse gear idler wheel |
| 11 | fixed wheel |
| 12 | fixed wheel |
| 13 | fixed wheel |
| 14 | fixed wheel |
| 15 | idler wheel |
| 16 | idler wheel |
| 17 | idler wheel |
| 18 | output gear wheel |
| 19 | output gear wheel |
| 20 | toothing on differential transmission |
| 21 | differential transmission |
| 22 | coupling device |
| 23 | coupling device |
| 24 | coupling device |
| 25 | coupling device |
| 30 | transmission |
| 31 | coupling device |
| 32 | coupling device |
| 33 | fixed wheel |
| 34 | idler wheel |
| 35 | idler wheel |
| 36 | idler wheel |
| 37 | fixed wheel |
| 38 | coupling device |
| G1 | first gear |
| G2 | second gear |
| G3 | third gear |
| G4 | fourth gear |
| G5 | fifth gear |
| G6 | sixth gear |
| G7 | seventh gear |
| RG | reverse gear |
| K1 | clutch |
| K2 | clutch |

The invention claimed is:

1. A dual-clutch transmission (1, 30) having at least six gears, the dual-clutch transmission comprising:

first and second clutches (K1, K2) each having an input side connected with a drive shaft (2) of a prime mover and an output side thereof connected with one of a hollow input shaft (3) and a solid Input shaft (4) disposed coaxially to each other;

first and second countershafts (5, 6) upon which are rotatably supported idler wheels (7, 8, 9, 10, 15, 16, 17, 34, 35, 36);

fixed gear wheels (11, 12, 13, 14, 33, 37) non-rotatably situated upon said hollow and solid input shafts (3, 4) which are in meshing contact with said idler wheels (7, 8, 9, 10, 15, 16, 17, 34, 35, 36);

coupling devices (22, 23, 24, 25, 31, 32) non-rotatably and axially movably supported upon said first and second countershafts (5, 6) and movable by selling devices, and output gear wheels (18, 19), which are in meshing contact with an output toothing (20) on a differential transmission (21), are respectively fastened on said first and second countershafts (5, 6);

wherein first and second fixed wheels (13, 14) are situated upon the hollow input shaft (3) and at least one other fixed wheel (respectively 12 or 37) is situated upon the solid input shaft (4) for respectively driving at least two idler wheels (8, 15 and 35, 36; 9, 16; 10, 17); and the gear wheels of the transmission are sequentially disposed therein, beginning from said first and second clutches (K1, K2), as follows: a reverse gear (RG) and a second gear G2, a fourth gear (G4) and a sixth gear (G6), a third gear (G3) and a fifth gear (G5), and a first gear (G1).

2. The dual-clutch transmission according to claim 1, wherein the first and second fixed wheels (13, 14) are fastened on said hollow input shaft (3) while the at least one other fixed wheel (12) is supported by said solid input shaft (4).

3. The dual-clutch transmission according to claim 1, wherein an idler wheel (16 or 36) of a highest gear (G6 or G7) and an idler wheel (15 or 16) of a second highest gear (G5 or G6) are situated upon said second countershaft (6) while an idler gear (9 or 35) of a third highest gear (G4 or G5) and an idler wheel (8 or 9) of a fourth highest gear (G3 or G4) are situated on said first countershaft (5).

4. The dual-clutch transmission according to claim 1, wherein said first and second countershafts (5, 6) are disposed one of paraxially and forming an angle with said hollow and solid input shafts (3, 4).

5. The dual-clutch transmission according to claim 1, wherein distances of both said first and second countershafts (5, 6) from the solid input shaft (4) and from the hollow input shaft (3) are different and said output gear wheels (18, 19) upon said first and second countershafts (5, 6) form, with the output toothing (20) upon a differential transmission (21), reduction ratios of different magnitudes.

6. The dual-clutch transmission according to claim 1, wherein said output gear wheels (18, 19) am situated on ends of said first and second countershafts (5, 6) adjacent said first and second clutches (K1, K2).

7. The dual-clutch transmission according to claim 1, wherein one of linear gears or non-linear gears are driven by the hollow input shaft (3).

8. The dual-clutch transmission according to claim 1, wherein a fourth gear (G4) and a reverse gear (RG) device (23) are alternatively non-rotatably connectable with said first countershaft (5) via a common coupling , and a second gear (G2) and a sixth gear (G6) are alternatively non-rotatably connectable via another common coupling device (25) with said second countershaft (6).

9. The dual clutch transmission according to claim 1, wherein a first gear (G1) and a third gear (G3) are alternatively non-rotatably connectable with said first countershaft (5) via a common coupling device (22), and a fifth gear (G5) is non-rotatably connectable with said second countershaft (6) via another coupling device (24).

10. The dual-clutch transmission according to claim 1, wherein the coupling devices (22, 23, 24, 25, 31, 32) are one of positive fit dog clutches and shifting sets.

11. The dual-clutch transmission according to claim 10, wherein each one of said coupling devices (22, 23, 24, 25, 31, 32) comprise a sliding sleeve axially movable upon the respective first and second countershafts (5, 6) but non-rotatably connected therewith and synchronizer rings disposed on opposite sides thereof.

12. The dual-clutch transmission according to claim 1, wherein idler gear wheels (7, 17, 10) of a first gear (G1), of a second gear (G2) and of a reverse gear (RG) are situated in areas adjacent sides of a housing of the transmission.

13. The dual-clutch transmission according to claim 1, wherein gear wheels (7, 17, 10) of a first gear (G1), of a second gear(G2) and a reverse gear (RG) are located in a central area of the transmission.

14. The dual-clutch transmission according to claim 1, wherein the first clutch (K1) is situated closer to the prime mover and is provided as a starting clutch for a first gear (G1).

15. The dual-clutch transmission according to claim 1, wherein the second clutch (K2) is situated further from the prime mover and is provided as a starting clutch for a reverse gear (RG).

16. The dual-clutch transmission according to claim 1, wherein the first and second clutches (K1, K2) are one of powershift clutches, multi-disc clutches and dry one-disc clutches.

17. The dual-clutch transmission according to claim 1, wherein said first and second clutches (K1, K2) are situated one of paraxially and coaxially with each other.

18. The dual-clutch transmission according to claim 1, wherein a separate starting element is situated between said drive shaft (2) of the prime mover and the input side of said first and second clutches (K1, K2).

19. The dual-clutch transmission according to claim 1, wherein a torsional vibration damper is situated between said first and second clutches (K1, K2) and the drive shaft (2) of the prime mover.

* * * * *